(12) United States Patent
Klatt

(10) Patent No.: US 7,385,827 B2
(45) Date of Patent: Jun. 10, 2008

(54) CONTACTING UNIT FOR A CARD-TYPE CARRIER ELEMENT IN ELECTRONIC COMPONENT GROUPS

(75) Inventor: Dieter Klatt, Wülfrath (DE)

(73) Assignee: STOCKO Contact GmbH & Co. KG (DE)

( * ) Notice: Subject to any disclaimer, the term of this patent is extended or adjusted under 35 U.S.C. 154(b) by 0 days.

(21) Appl. No.: 11/032,448

(22) Filed: Jan. 10, 2005

(65) Prior Publication Data
US 2005/0168928 A1 Aug. 4, 2005

(30) Foreign Application Priority Data
Jan. 9, 2004 (DE) .................. 20 2004 000 179 U

(51) Int. Cl.
*H05K 7/10* (2006.01)
(52) U.S. Cl. .................. 361/737; 439/945; 439/946; 235/441
(58) Field of Classification Search .............. 361/737, 361/752, 730, 736; 235/441, 487, 492; 439/76.1, 439/638, 945, 946
See application file for complete search history.

(56) References Cited

U.S. PATENT DOCUMENTS

| | | | | | |
|---|---|---|---|---|---|
| 5,651,068 | A | * | 7/1997 | Klemba et al. | 713/159 |
| 5,752,857 | A | * | 5/1998 | Knights | 439/638 |
| 5,835,596 | A | * | 11/1998 | Klemba et al. | 713/172 |
| 5,907,620 | A | * | 5/1999 | Klemba et al. | 713/189 |
| 6,053,775 | A | * | 4/2000 | Ungermann et al. | 439/630 |
| 6,234,844 | B1 | | 5/2001 | Somerville et al. | |
| 6,272,017 | B1 | * | 8/2001 | Klatt et al. | 361/737 |
| 6,315,205 | B1 | * | 11/2001 | Bates, III | 235/479 |
| 6,333,854 | B1 | * | 12/2001 | Sasaoka et al. | 361/737 |
| 6,402,558 | B1 | * | 6/2002 | Hung-Ju et al. | 439/638 |
| 6,547,603 | B1 | * | 4/2003 | Yu | 439/638 |
| 6,877,995 | B1 | * | 4/2005 | Chen | 439/76.1 |
| 7,009,846 | B1 | * | 3/2006 | Wang et al. | 361/737 |
| 7,038,916 | B2 | * | 5/2006 | Chen | 361/737 |
| 7,044,767 | B2 | * | 5/2006 | Wong et al. | 439/377 |
| 7,059,913 | B1 | * | 6/2006 | Chen | 439/638 |
| 7,075,793 | B2 | * | 7/2006 | Le et al. | 361/737 |
| 7,080,789 | B2 | * | 7/2006 | Leaming | 235/492 |
| 7,090,537 | B1 | * | 8/2006 | Nakamura | 439/630 |
| 7,114,993 | B2 | * | 10/2006 | Chen | 439/630 |
| 2003/0235040 | A1 | * | 12/2003 | Liu et al. | 361/737 |
| 2005/0258243 | A1 | * | 11/2005 | Hsieh | 235/441 |

FOREIGN PATENT DOCUMENTS

| | | |
|---|---|---|
| DE | 43 10 517 | 6/1994 |
| DE | 202 10 362 | 10/2002 |

\* cited by examiner

*Primary Examiner*—Diego Gutierrez
*Assistant Examiner*—Dameon E Levi
(74) *Attorney, Agent, or Firm*—Cantor Colburn LLP

(57) ABSTRACT

The invention relates to a contacting unit for a card-type carrier element in electronic component groups with a housing, the contact unit including a bonding pad on one end face, a slot-like slide-in port that joins on the end face opposite the bonding pad, into which the card-type carrier element, especially a chip card in accordance with ISO 7816, can be inserted, and a printed circuit board, arranged in the housing parallel to the slide-in port and electrically connected to the bonding pad, wherein said printed circuit board is equipped on one surface with contact elements for contacting the card-type carrier element, characterized in that said unit is designed in accordance with the PCMCIA Express Card Standard.

15 Claims, 4 Drawing Sheets

CONTACTING UNIT FOR A CARD-TYPE CARRIER ELEMENT IN ELECTRONIC COMPONENT GROUPS

TECHNICAL FIELD OF INVENTION

The present invention relates to a contacting unit for a card-type carrier element in electronic component groups, with a housing, which comprises a bonding pad on one end face, a slot-like slide-in port that joins on the end face opposite the bonding pad, into which the card-type carrier element, especially a chip card in accordance with ISO 7816, can be inserted, and a printed circuit board, arranged in the housing parallel to the slide-in port and electrically connected to the bonding pad, wherein said printed circuit board is equipped on one surface with contact elements for contacting the card-type carrier element.

BRIEF DESCRIPTION OF RELATED ART

Contacting units for card-type carrier elements in electronic component groups based upon the so-called PCMCIA standard are known in the state of the art in numerous embodiments, for example from DE 295 05 678 U1 or DE 298 11 425 U1. Within the framework of increasing mobility in the field of computer technology, contacting units of this type for card-type carrier elements of electronic component elements, especially a chip card in accordance with ISO 7816, are being used with increasing frequency to improve variability and transportability. In such cases the contacting units can be inserted or plugged into a receiving slot of a corresponding device that utilizes contacting units, such as a notebook, laptop, etc. The receiving slot of the device comprises a slot that operates in conjunction with the bonding pad that is present on the end face of the housing of the contacting unit, as a rule in accordance with the PCMCIA Standard, said slot effecting mechanical and electrical contacting.

Further, the PCMCIA Express Card standard—a further modification of the PCMCIA Standard—is known, which contains modules comprising two different formats. The thickness of this type of Express Card module is 5 mm, the length 75 mm, and the width, depending upon the type, is either 34 mm or 54 mm. Express Card modules are thus more compact in terms of their dimensions than known PCMCIA modules.

The known contacting units can be produced only at relatively high economic cost, especially due to the large amount of material required by their design, and are only suited to a limited extent for a cost-effective mass production in the sense of a large-scale use of known card-type carrier elements. In addition, the handling properties of known contacting units based upon their design, especially their larger dimensions, is in need of improvement with respect to variability and transportability.

BRIEF SUMMARY OF THE INVENTION

Considering this state of the art, the present invention provides a generic contacting unit for a card-type carrier element of electronic component groups that can be produced at low economic cost, especially in mass production, and is easy and safe to use.

The present invention provides that the contacting unit is designed in accordance with the PCMCIA Express Card Standard.

By designing the contacting unit in accordance with the PCMCIA Express Card Standard, due to the smaller dimensions of the contacting unit both handling of the card, especially with respect to variability and transportability, and the cost-effectiveness of the card, especially due to the low material requirements and the low packaging and transport costs, are improved.

Advantageously, the end-face width of the housing or the end-face width of the slide-in port is narrower than the width of the card-type carrier element. In one advantageous embodiment of the invention, the housing comprises a base plate and a cover plate, between which the slot-type slide-in port, which joins on an end face of the housing, for receiving the card-type carrier element is provided, wherein the end-face width of the base plate of the housing and/or the end-face width of the cover plate of the housing is narrower than the width of the card-type carrier element. Thus, according to the invention, card-type carrier elements, especially chip cards pursuant to ISO 7816, the width of which is approximately 54 mm, can be used in a contacting unit of narrower width, preferably a contacting unit having an end-face width of 34 mm, in accordance with the PCMCIA Express Card/34 Standard.

Advantageously the slide-in port is open continuously across its entire length in the direction of insertion of the card-type carrier element, at least on one side, preferably on both sides. A further embodiment of the invention provides that the base plate and the cover plate of the housing are firmly connected to one another exclusively in the area adjacent to the slide-in port in the direction of insertion of the card-type carrier element. In a preferred embodiment of the invention, the attachment of the base plate and cover plate of the housing in the area adjacent to the slide-in port in the direction of insertion of the card-type carrier element also forms a pivoting axis, about which the base plate and/or the cover plate of the housing can be pivoted slightly relative to one another such that the height of the slide-in port can be altered against the effect of a restoring force. In this manner, the card-type carrier element is advantageously held in a clamping fashion when it is inserted into the slide-in port. Advantageously the height of the slide-in port decreases with an increasing distance from the connection when the card-type carrier element has been removed. When the card-type carrier element is inserted into the slide-in port of the contacting unit, said port is then expanded and the card-type carrier element is held securely in the slide-in port due to the elastic shape retention action present there. At the same time, a high degree of dimensional stability of the contacting unit and compensation of production-related tolerances can be achieved in this manner. The cover plate can be designed to be shorter and/or narrower than the base plate. In a further embodiment of the invention, the base plate and the cover plate of the housing are congruent.

In a further embodiment of the invention, the contact elements of the printed circuit board are arranged in the direction of the cover plate of the housing, or are arranged on the surface of the printed circuit board that faces the cover plate.

Advantageously, at least the base plate of the housing is provided with a lip-like projection, which extends the length of the contacting unit beyond the PCMCIA Express Card format. The lip-like projection can, for example, serve as an insertion guide for the card-type carrier element to be inserted into the slide-in port of the contacting unit, and can further improve handling of the contacting unit during its insertion into and/or removal from a receiving slot provided for this purpose in a device that utilizes a corresponding contacting unit, especially a notebook, laptop, or some similar device.

In another advantageous embodiment of the invention, the base plate of the housing and the printed circuit board are equipped with an extension, which upon insertion of the contacting unit into a receiving slot provided for this purpose is located outside of the receiving slot, which preferably is designed in accordance with the PCMCIA format. In a particularly advantageous embodiment of the invention, electronic components are installed in the extension, preferably sensor elements and/or antennae and/or optical display elements, such as biometric sensor elements for acquiring biometric data such as fingerprints or the like, so that the contacting unit of the invention can be used as a security device for authorizing access or the like.

BRIEF DESCRIPTION OF THE DRAWINGS

Further details, features and advantages of the invention are described below with reference to the exemplary embodiments illustrated in the figures. These show.

DETAILED DESCRIPTION OF THE INVENTION

Figure 1:
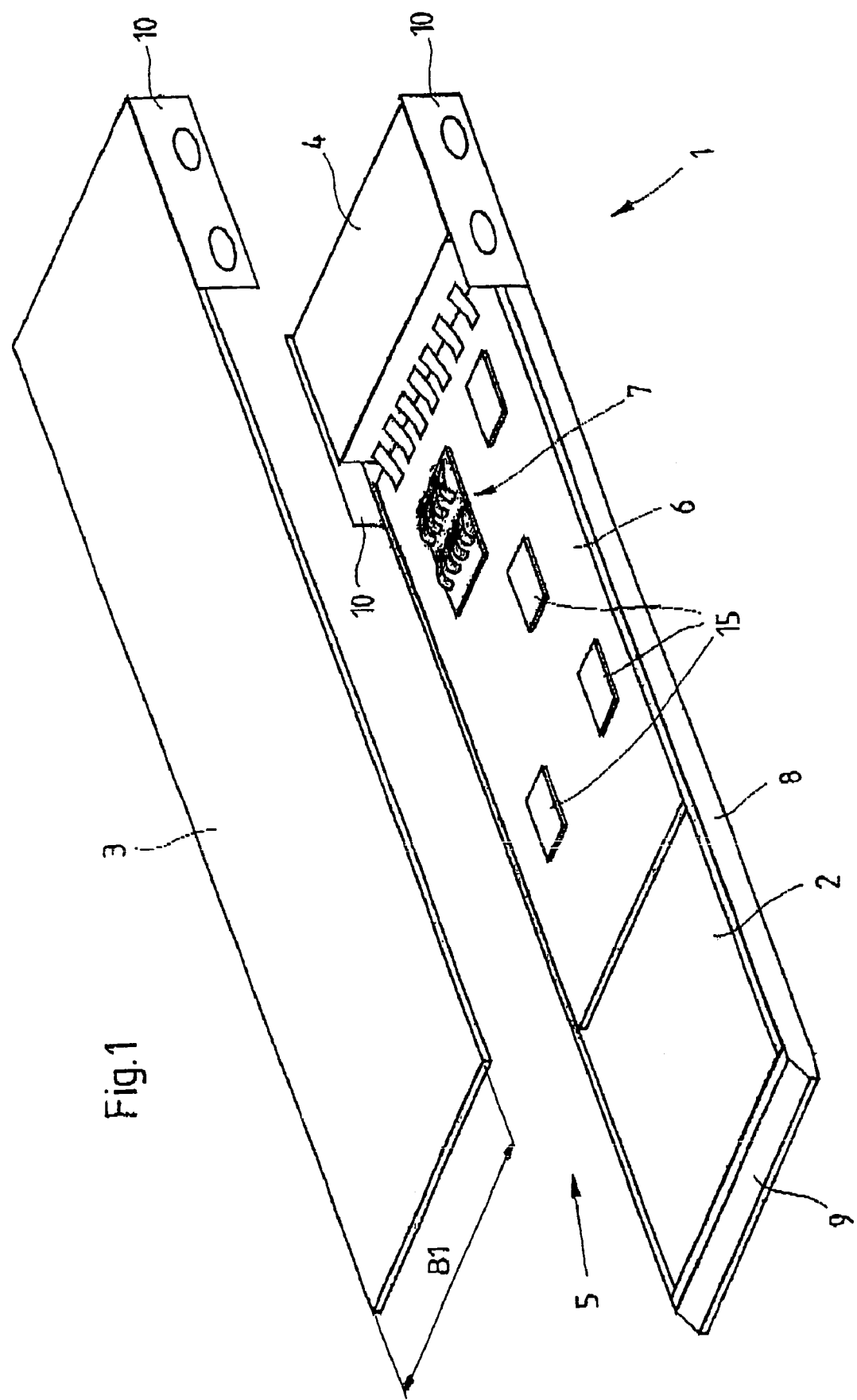
FIG. 1 in a schematic, perspective view, a contacting unit according to the invention.
Figure 2:
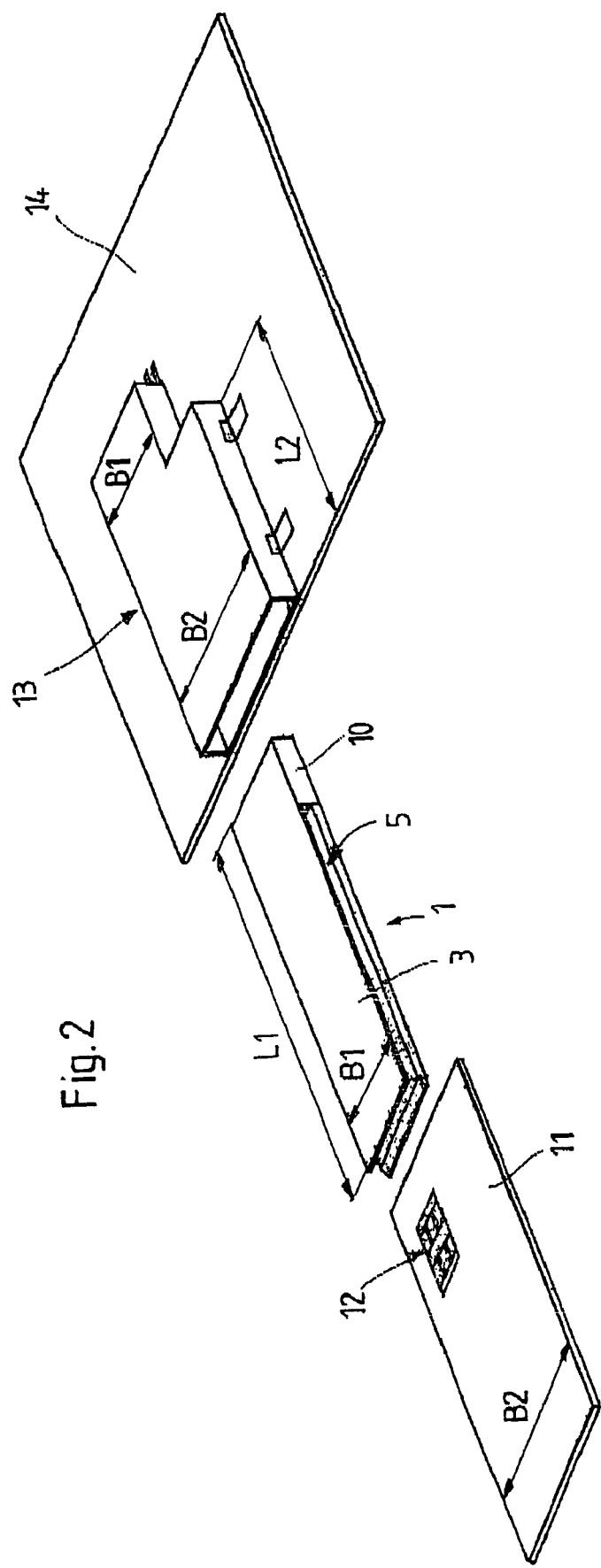
FIG. 2 in a schematic, perspective view, the contacting unit according to FIG. 1 with a card-type carrier element and a receiving slot in the non-inserted state, with a non-inserted card-type carrier element.
Figure 3:
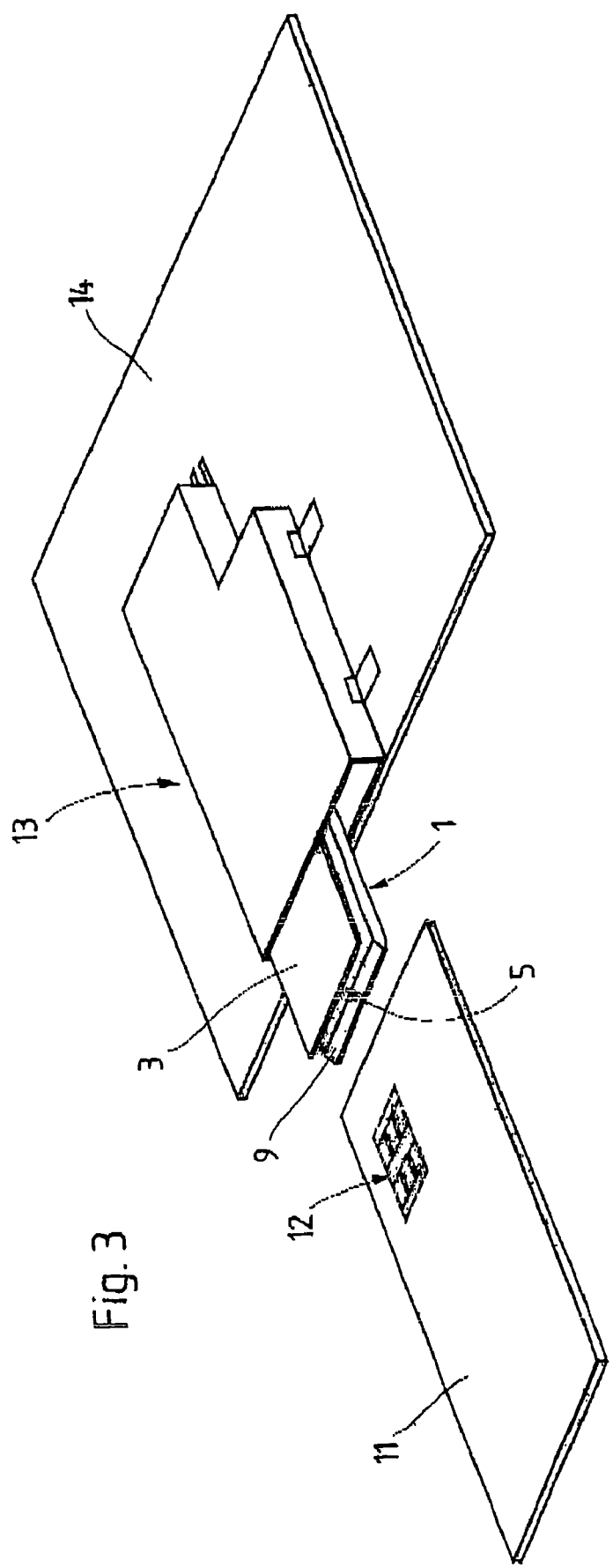
FIG. 3 in a schematic, perspective view, the contacting unit according to FIG. 1 with a card-type carrier element and a receiving slot in the inserted state, with a non-inserted card-type carrier element, and FIG. 4 in a schematic, perspective view, the contacting unit according to FIG. 1 with the card-type carrier element and the receiving slot in the inserted state, with an inserted card-type carrier element.
Figure 4:
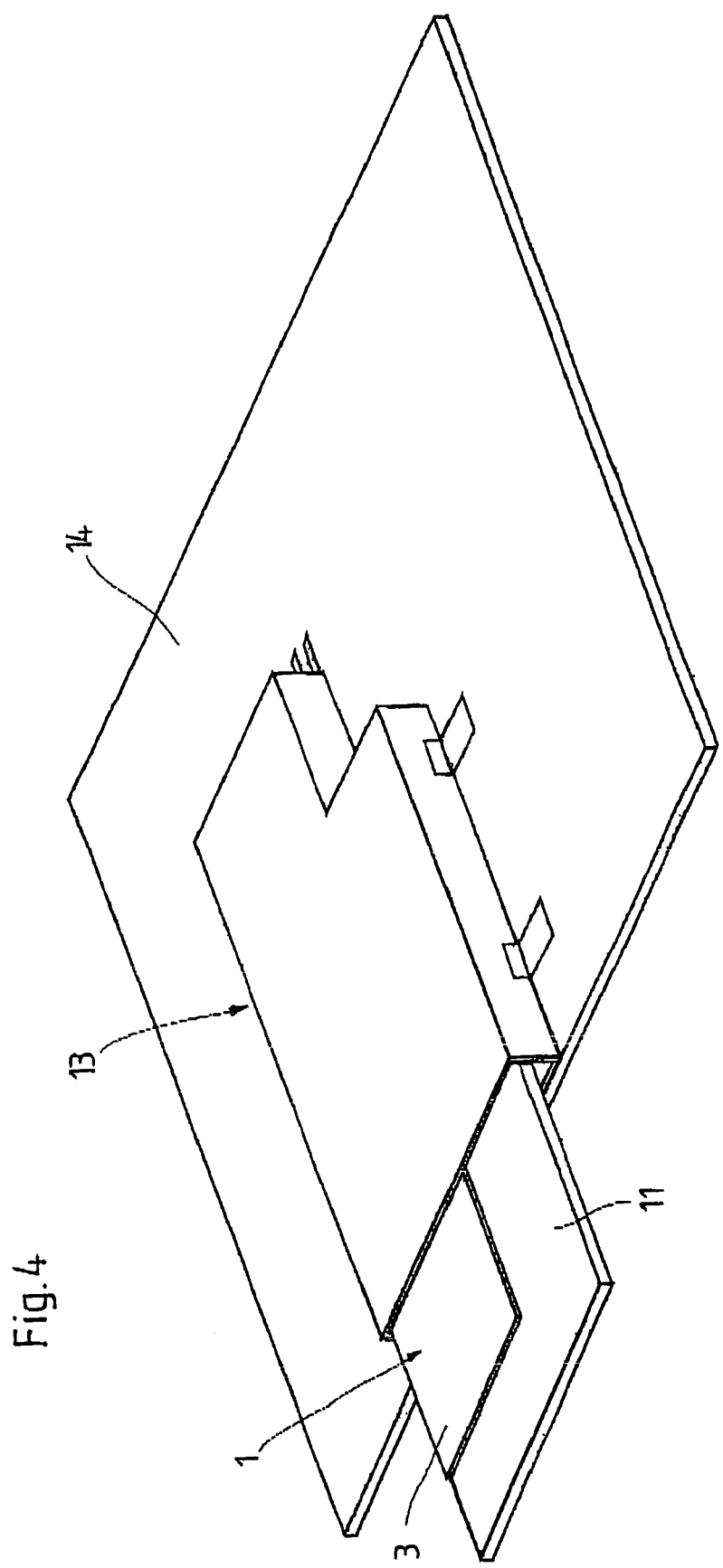

The exemplary embodiment of the invention depicted in FIG. 1 shows a contacting unit 1 designed as a chip card reader, which is provided to be contacted, via a standard PCMCIA Express Card interface, with a notebook, designated in FIG. 2 through 4 by the number 14 by way of example, as the device that utilizes the contacting unit 1. The contacting unit 1 is comprised of a housing with a base plate 2, a PCMCIA Express Card bonding pad 4 in the form of a plug connector strip with connecting poles at the end that is the front in the direction of insertion into the notebook 14, and in FIG. 1 is on the right, an insertion guide 9 on the opposite end for the insertion of a chip card 11 according to ISO 7816 as a card-type carrier element, and a cover plate 3 that extends parallel to and spaced from the base plate 2, and which is rigidly connected to the base plate 2 in the area of the bonding pad 4 via connecting straps 10 on the base plate 2 and the cover plate 3, wherein the connecting straps 10 of the base plate 2 and the cover plate 3 are welded to one another here. In this, the base plate 2 and the cover plate 3 of the housing are firmly attached to one another exclusively in the area adjacent to the slide-in port 5 in the direction of insertion of the card-type carrier element 11.

The connection of the base plate 2 and the cover plate 3 of the housing in the area adjacent to the slide-in port 5 in the direction of insertion of the card-type carrier element 11 at the same time forms a pivoting axis, about which the base plate 2 and/or the cover plate 3 of the housing can be pivoted slightly relative to one another such that the height of the slide-in port 5 can be altered against the effects of a restoring force. The height of the slide-in port 5 thereby decreases with an increasing distance from the point of attachment when the card-type carrier element 11 is removed.

The above-mentioned components of the contacting unit 1 are borne on a plastic frame 8, which also holds a contact element 7 for contacting the card-type carrier element 11 and a printed circuit board 6 containing other electronic components 15, spaced from and parallel to the cover plate 3, such that between the printed circuit board 6 and the cover plate 3 a slide-in port 5 for the card-type carrier element 11 is formed, wherein said card-type carrier element can be inserted into the contacting unit 1 and pulled out of it again via an insertion slot that joins on the end face opposite the bonding pad, in FIG. 1 on the left, and the insertion guide 9. Contacting can thereby take place via the contact elements 12 arranged on the surface of the card-type carrier element 11 and the corresponding contact elements 7 on the printed circuit board 6, arranged on the surface of the printed circuit board 6 that faces the cover plate 3, which contacting enables a processing of the card-type carrier element 11 via the contacting unit 1 on the part of the notebook 14 when the contacting unit 1 is inserted into the receiving slot 13 in the notebook 14 designed for this purpose and is connected to its interface via the bonding pad 4.

The insert card-type housing of the contacting unit 1 has on its end face a width B1 of 34 mm, which corresponds to the insertion width of the PCMCIA Express Card standard, and a length L1 of at least 75 mm. The end-face width B1 of the contacting unit 1 is thus narrower than the end-face width B2 of the card-type carrier element 11, which can be inserted into the slide-in port 5 of the contacting unit 1 for contacting purposes, and which, here as an ISO 7816 chip card, has an end-face width B2 of approximately 54 mm.

FIG. 2 through 4 show how the contacting unit 1 can be inserted into the receiving slot 13 in the notebook 14 designed for this purpose, and how the card-type carrier element 11 can be inserted into the slide-in port 5 of the contacting unit 1.

FIG. 2 shows the card-type carrier element 11 in front of the insertion slot in the slide-in port 5 of the contacting unit 1, which is located in front of the receiving slot 13 of the notebook 14. The receiving slot 13 of the notebook 14 is designed in accordance with the PCMCIA Express Card Standard and is equipped here with a narrow, longer slot, shown in FIG. 2 through 4 on the left in the direction of insertion, for receiving PCMCIA Express Card modules having an insertion width of 34 mm, and, offset somewhat from this, a broader slot having the length L2, which is shorter than the length L1, wherein said slot is represented in FIG. 2 through 4 on the right in the direction of insertion, and is designed to receive PCMCIA Express Card modules having an insertion width of 54 mm. Thus both PCMCIA Express Card modules having an insertion width of 34 mm and PCMCIA Express Card modules having an insertion width of 54 mm can be inserted into the receiving slot 13.

FIG. 3 shows the contacting unit 1 in the narrower, longer slot of the receiving slot 13 designed to receive PCMCIA Express Card modules, which in FIG. 2 through 4 is shown on the left in the direction of insertion, wherein the card-type carrier element 11 has not yet been inserted into said contacting unit. As is apparent from FIG. 3, the length L1 of the contacting unit 1 here is greater than 75 mm so that the contacting unit 1 protrudes from the receiving slot 13 of the notebook 14. This extension of the contacting unit 1 protruding from the receiving slot 13 of the notebook 14 improves handling with respect to insertion and removal of the contacting unit 1 into and/or from the receiving slot 13, and furthermore enables the installation of additional electronic components in the area of the extension of the contacting unit 1, for example the installation of biometric sensor elements.

FIG. 4 shows the contacting unit 1 inserted into the narrower, longer slot of the receiving slot 13 designed to receive PCMCIA Express Card modules, which in FIG. 2 through 4 is shown on the left in the direction of insertion, with the card-type carrier element 11 inserted into the contacting unit.

The exemplary embodiments of the invention illustrated in the drawings serve only the explanation of the invention and do not limit its scope.

The invention claimed is:

1. Contacting unit for a card-type carrier element, especially a chip-card according to ISO 7816, of electronic component assemblies, said contacting unit having a housing comprising
   a connecting area arranged at one end face of said housing;
   a slot-like slide-in port arranged opposite to said connecting area at the end face of said housing, into which the card-type carrier element, can be inserted wherein an end-face width of the housing or an end-face width of the slide-in port is smaller than a width of the card-type carrier element; and
   a printed circuit board arranged in the housing parallel to the slide-in port and being electrically connected with the connecting area;
   wherein said printed circuit board is equipped with contact elements at a surface of said circuit board for contacting the card-type carrier element;
   wherein said contacting unit is designed in accordance with PCMCIA Express Card Standard.

2. Contacting unit pursuant to claim 1, wherein said end-face width of the housing, said end-face width of the slide-in port, or both is narrower than a width of the card-type carrier element.

3. Contacting unit pursuant to claim 1, wherein the housing is equipped with a base plate and a cover plate, between which the slot-type slide-in port, which joins on one end face of the housing, for receiving the card-type carrier element is provided, wherein an end-face width of the base plate of the housing, an end-face width of the cover plate of the housing or both is narrower than a width of the card-type carrier element.

4. Contacting unit pursuant to claim 1, wherein the slide-in port is open continuously across its entire length in a direction of insertion of the card-type carrier element, at least on one side.

5. Contacting unit pursuant to claim 3, wherein the base plate and the cover plate of the housing are firmly attached to one another in an area adjacent to the slide-in port in a direction of insertion of the card-type carrier element.

6. Contacting unit pursuant to claim 5, wherein the connection of the base plate and the cover plate of the housing, in the area adjacent to the slide-in port in the direction of insertion of the card-type carrier element also forms a pivoting axis, about which the base plate and/or the cover plate of the housing can be pivoted slightly relative to one another such that a height of the slide-in port can be altered against an effect of a restoring force.

7. Contacting unit pursuant to claim 6, wherein the height of the slide-in port decreases with increasing distance from the point of attachment when the card-type carrier element is removed.

8. Contacting unit pursuant to claim 3, wherein the cover plate is designed to be shorter and/or narrower than the base plate.

9. Contacting unit pursuant to claim 3, wherein the base plate and the cover plate of the housing are congruent.

10. Contacting unit pursuant to claim 1, wherein end-face width is in accordance with the PCMCIA Express Card/34 Standard.

11. Contacting unit pursuant to claim 3, wherein the contact elements of the printed circuit board are oriented in the direction of the cover plate of the housing.

12. Contacting unit pursuant to claim 3, wherein at least the base plate of the housing is equipped with a lip-like projection, which extends the length of the contacting unit beyond PCMCIA Express Card format.

13. Contacting unit pursuant to claim 3, wherein the base plate of the housing and the printed circuit board are equipped with an extension, which, when the contacting unit is inserted into a receiving slot provided for this purpose of a device that utilizes contacting units, is located outside of the receiving slot, which preferably is designed in accordance with PCMCIA Express Card format.

14. Contacting unit pursuant to claim 13, wherein electronic components and/or optical display elements, are installed in the extension.

15. Contacting unit pursuant to claim 14, wherein the electronic components include sensor elements and/or antennae.

* * * * *